Feb. 17, 1953  C. H. FOLMSBEE  2,628,633
SAFETY VALVE
Filed Aug. 9, 1947
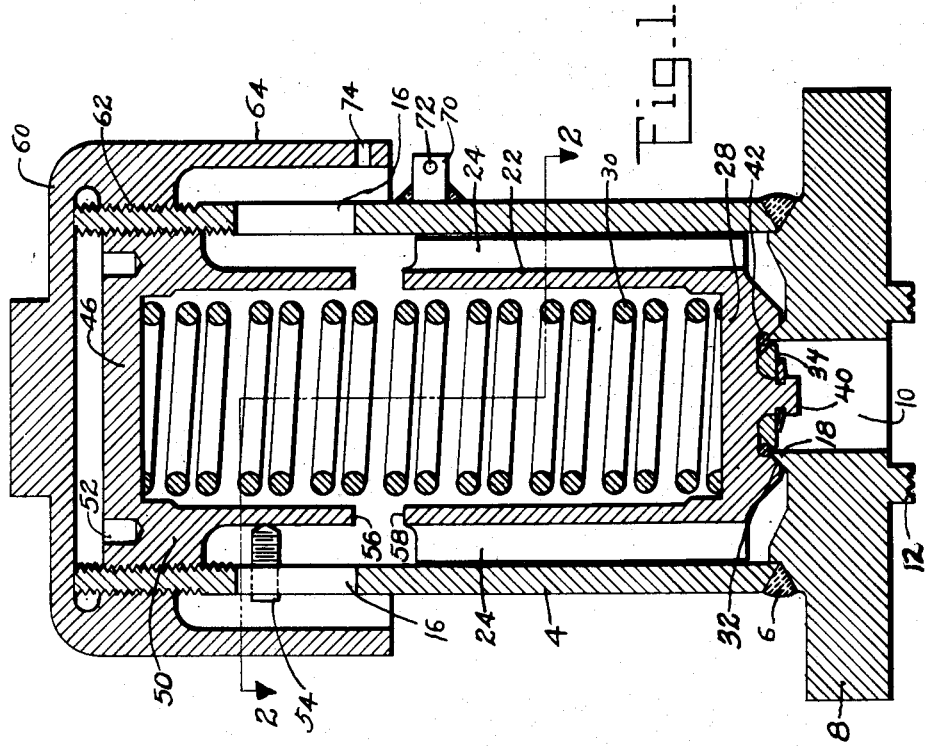
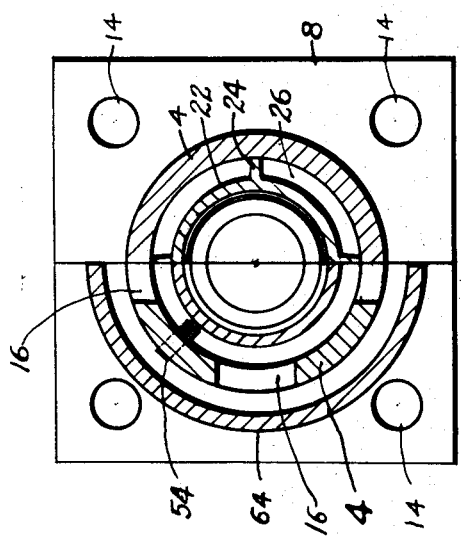
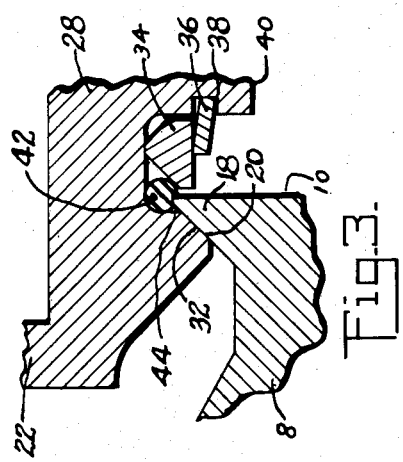
INVENTOR
Clyde H. Folmsbee
BY
Robert A. Shields
ATTORNEY Patented Feb. 17, 1953

2,628,633

UNITED STATES PATENT OFFICE 2,628,633

SAFETY VALVE

Clyde H. Folmsbee, Bloomsburg, Pa., assignor to American Car and Foundry Company, New York, N. Y., a corporation of New Jersey Application August 9, 1947, Serial No. 767,742

1 Claim. (Cl. 137—469)

This invention relates to safety valves which are intended for use with storage vessels containing corrosive gases such as chlorine.

Safety valves as previously built for corrosive gas or similar service have had a metallic seat contact for holding the primary pressure and the entire valve has then been sealed by means of a rupture disk or other device. With such a construction corrosive gases would come in contact with the spring or other parts of the valve and cause corrosion with possible sticking of the parts or weakening of the spring. Also, since the rupture disks trap a certain amount of gas within the valve a tiny leakage at the valve seat would result in a false popping of the valve at a pressure higher than intended. It is an object, therefore, of the present invention to provide a safety valve having the parts so arranged as to obviate the necessity for a sealing rupture disk.

A further object of the invention is the provision of an improved type of safety valve having a resilient seal between the source of pressure and the valve seat.

A still further object of the invention is the provision of an improved safety valve having the parts so arranged as to give a more constant operation throughout the life of the valve.

These and other objects of the invention will be apparent to persons skilled in the art from a study of the following description and accompanying drawings, in which Fig. 1 is a sectional view taken substantially through the center of the valve;

Fig. 2 is a sectional view taken substantially on line 2—2 of Fig. 1, and

Fig. 3 is an enlarged sectional view showing the valve seat and seal arrangement.

Referring now to the drawings in detail, it will be seen that the valve casing has been formed by a piece of pipe or other tubular member 4 threaded both internally and externally at its upper end and welded as at 6 to a base member 8. This base member is provided with a passage 10 and an annular rib 12 grooved to receive a sealing member which will be clamped between the valve and the tank structure by means of bolts or other devices extending through holes 14 in the base member. The upper end portion of the tubular casing 4 has a plurality of holes 16 pierced therein in order to permit the escape of gases from the interior of the valve. The base member 8 is preferably machined to provide an upstanding lip 18 having its outer surface beveled to provide a valve seat 20 which surrounds the passage 10 at its upper end.

Mounted within the valve casing is an upwardly open cup-shaped valve member 22 having its walls spaced from the walls of the casing yet guided therein by means of a plurality of ribs 24. The spacing of the valve member from the casing walls is such as to provide free passageways 26 (Fig. 2) of sufficient area as to permit full discharge of matter escaping through passage 10. The lower end of the cup-like valve member is closed by the bottom wall 28 which provides on its upper surface a seat for the spring 30 and on its lower surface is machined to provide a beveled valve seat 32 adapted to engage the valve seat 20 previously referred to. Inwardly of the valve seat 32 the bottom wall 28 is cut away to provide space for reception of the retaining ring 34 adapted to be held in place by a spring snap ring 36 engaged in a groove 38 of a centrally extending boss 40. The upper outer surface of the ring 34 is beveled and adapted to engage lightly a resilient annulus 42 of circular cross-section. This resilient annulus is adapted, when the valve is in closed position, to rest lightly upon the upper edge of lip 18 and effectively seal the valve against leakage. Outward pressure of matter in passage 10 will cause the resilient member 42 to shift or be urged toward the line of engagement between valve seating surfaces 20 and 32. In cases where the valve seats 20 and 32 are prefect, the resilient annulus will be without strain and only lightly engaging the lip and valve bottom 28. If, however, there is any leakage or tendency to leak between the valve seats, then the resilient annulus will shift toward the valve seats and prevent such leakage by wedging itself into the small area 44 bounded by the annulus, the lip 18 and the valve projection on which is formed the seat 32. With such an arrangement it will be seen that leakage can not occur until the popping point of the valve is reached and it will further be seen that the lifting area will be substantially constant throughout the life of the valve instead of varying as is the case with valves relying on metallic seats. For example, metallic seats 20 and 32 might contact only at their outer edges giving a relatively large lifting area, then as the valve wears in the area would decrease giving a much higher popping point.

In order to hold the cup-shaped valve in position with its seat 32 in engagement with seat 20 and resilient member 42 in light engagement with lip 18, the spring 30 is provided bearing at its lower end on the bottom wall 28 and at its upper end upon the top wall 46 of the downwardly opening cup-like retaining and adjusting member 50. This adjusting and retaining member has its outer surface threaded to engage the internal threads of casing 4 and its position in the casing is adjusted by means of a spanner wrench or other means engageable in holes 52. The downwardly directed sides of the cup-like retaining member house the upper end of the spring 30 and is adapted to be engaged by one or more set screws 54 having threaded engagement with the casing 4 and adapted to lock the adjusting member in any predetermined adjusted position. The lower edge 56 of the downwardly open cup-like adjusting member is adapted to be engaged by the upper edge 58 of the upwardly open cup-like valve member 22, thus limiting the upward movement of the valve and give protection to the spring.

In order to prevent tampering with the setting of the adjusting member 50, a cap member 60 is provided having internal threads 62 adapted to engage the external threads of the casing 4. This cap member has a depending skirt 64 adapted to overlap and be spaced from the holes 16, thus directing the gases or matter escaping through holes 16 downwardly and also to prevent entrance of foreign matter into the valve. In order that the valve may be sealed and thus indicate any tampering after setting a lug 70 is welded or otherwise fastened to the casing and pierced as at 72 to receive a seal which will also pass through a hole 74 in the skirt portion 64 of the cap.

From the preceding it will be seen that the valve may be made of relatively small compact parts, thus permitting a low height valve which is so desirable in connection with portable tanks where the projecting valve fixtures may be knocked off by stationary structures. It will also be seen that, as pointed out previously, the popping point of the valve will, due to the substantially constant area, remain constant throughout the life of the valve. It will likewise be obvious that the resilient annulus 42 will protect all parts of the valve including the valve seats from contact with the corrosive gases except during the time when popping occurs. The annulus 42 can be readily replaced by merely removing the snap ring 36 and retaining ring 34, thus producing a valve which can be readily repaired when necessary. While the valve has been described more or less in detail, it will be clear to persons skilled in the art that various modifications and rearrangements of parts may be made without departing from the scope of the invention as defined by the following claim.

What is claimed is:

In a safety valve, a body member having a passage therethrough, a body valve seat surrounding the upper end of said passage outwardly thereof, a valve reciprocable axially of the passage and having a seat engageable with said first named seat outwardly of the passage, resilient means normally holding said seats in engagement, an annular recess formed in the valve upwardly above said seat and adjacent thereto and outwardly beyond the inner marginal edge of the body valve seat, said recess being defined in part by a curved outer wall portion, a deformable annulus of circular cross section carried in said recess inwardly of the inner edge of said valve seat, the outer wall portion of said recess having a radius approximately the same as the radius of a cross section of the annulus and at least as great as said radius, and means lightly engaging the lower inner portion of said annulus to hold the same in position in the recess of the valve and to provide therewith a first chamber inwardly of the annulus, said annulus also engaging a portion of the body member inwardly of the engaging seats and defining with the valve and body member a second chamber outwardly of the annulus, and said annulus being shiftable laterally and downwardly under pressure along said curved outer wall portion and deformable into said second chamber and towards the cooperating surfaces of the body seat and valve seat to seal the same against leakage of fluid pressure in the passage when said seats are held in engagement by said resilient means.

CLYDE H. FOLMSBEE.

REFERENCES CITED

The following references are of record in the file of this patent:

UNITED STATES PATENTS

| Number | Name | Date |
|---|---|---|
| 150,536 | Crosby | May 5, 1874 |
| 151,027 | Hodgins | May 19, 1874 |
| 432,140 | Kilborn | July 15, 1890 |
| 763,208 | Robinson | June 21, 1904 |
| 1,725,297 | Paterson | Aug. 20, 1929 |
| 2,072,271 | Meadows | Mar. 2, 1937 |
| 2,110,481 | Crocker | Mar. 8, 1938 |
| 2,479,737 | Garretson | Aug. 23, 1949 |

FOREIGN PATENTS

| Number | Country | Date |
|---|---|---|
| 12,911 | Great Britain | June 7, 1904 |